No. 864,272. PATENTED AUG. 27, 1907.
J. S. STONE.
SPACE TELEGRAPHY.
APPLICATION FILED JAN. 4, 1907.

WITNESSES:
E. B. Tomlinson
G. A. Higgins

INVENTOR:
John Stone Stone
by Browne & Woodworth
Attorneys.

UNITED STATES PATENT OFFICE.

JOHN STONE STONE, OF BOSTON, MASSACHUSETTS, ASSIGNOR TO WILLIAM W. SWAN, TRUSTEE, OF BROOKLINE, MASSACHUSETTS.

SPACE TELEGRAPHY.

No. 864,272.   Specification of Letters Patent.   Patented Aug. 27, 1907.

Application filed January 4, 1907. Serial No. 350,720.

*To all whom it may concern:*

Be it known that I, JOHN STONE STONE, a citizen of the United States, and a resident of Boston, in the county of Suffolk and State of Massachusetts, have invented a new and useful Improvement in Space Telegraphy, of which the following is a specification.

My invention relates to space telegraphy by electromagnetic waves and more especially to systems for receiving the energy of such waves.

The object of my invention is to provide a space telegraph receiving system in which a direct-current electro-translating device may be employed in a local circuit which includes an oscillation detector of the type which causes the development of pulsating or, more generally, vibratory, currents in said local circuit when said detector is acted upon by electrical oscillations.

In a large number of types of oscillation detectors, the current in the local circuit is pulsating or vibratory under normal conditions of operation and with the usual circuital connections. An example of such a detector is the audion, an apparatus which is now well known and which has been fully described in a paper by Dr. Lee de Forest, published in the *Proceedings of the American Institute of Electrical Engineers* October, 1906, page 719, to which reference may be had for a more detailed description thereof than is necessary to set forth herein. It is to be understood, however, that so far as the appended claims are concerned I consider any other oscillation detector in the local circuit of which vibratory currents are produced, to be the equivalent of the audion. Accordingly I consider my invention, broadly stated, to reside in the combination of a local receiving circuit, an oscillation detector which under normal conditions of operation will cause pulsating currents to be developed in said local circuit, a source of unidirectional electromotive force, an electro-translating device and a rectifier, all connected in series in said circuit.

Figure 1:
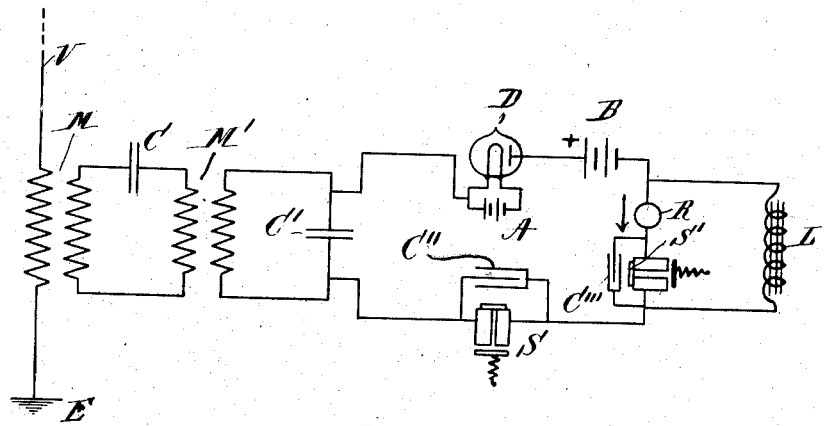
Figure 2:
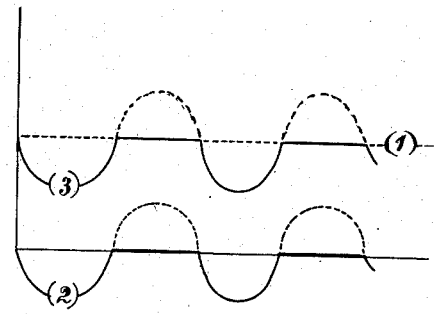
Figure 3:
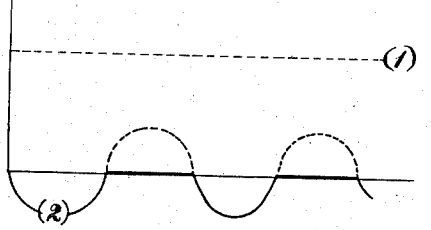

My invention may best be understood by having reference to the drawings which accompany and form a part of this specification and in which Figure 1 represents in diagram a space telegraph receiving system illustrating one embodiment of my invention; and in which Figs. 2 and 3 are curves drawn to rectangular coördinates, of which the ordinates represent current amplitudes and the abscissæ represent time.

In the figures, V is an elevated conductor, M M' are transformers, C C' C'' C''' are condensers, D is an audion, A and B are batteries, S S' are electro-translating devices of any appropriate type which may be operated by direct current, R is a rectifier so constructed and arranged as to permit positive current to pass in the direction of the arrow, or, in other words, to oppose the flow therethrough of current from the battery B, L is a rela-
tively high impedance of low ohmic resistance and E is an earth connection.

The circuit C' M' is a resonant receiving circuit attuned to the frequency of the waves the energy of which is to be received and C M M' is a resonant weeding out circuit interposed between said resonant receiving circuit and the elevated conductor system V M E and attuned to said frequency. The functions of the condensers C'' C''' are to afford paths of small impedance around the translating devices S S'.

In Figs. 2 and 3, the curve (1) represents the amplitude of the direct current normally flowing through the audion, the secondary of the transformer M', the device S and the circuit which is connected in shunt to the rectifier and which includes the impedance L. When electrical oscillations act upon the audion, the current which flows in the local circuit thereof is greatly reduced, such reduction sometimes being so great that the value of the current in the local circuit when the audion is operated upon by electrical oscillation is only one-half the value of the current normally flowing therein. By connecting the rectifier R as shown practically no current normally flows through either the device S or the device S' if the inductance L be omitted. When both the rectifier R and inductance L are included in the system as shown, normally the full battery current flows through the device S and practically no current flows through the device S'. When oscillations operate upon the audion, the current which would be developed in the circuit of the device S' were the rectifier omitted from the system shown in Fig. 1 would be represented by a curve somewhat similar to the sinuous curve (2) which is shown in full and dotted lines in Figs. 2 and 3; and when said rectifier is included as shown, the current which would be developed in the circuit of said device S' would be represented by a curve somewhat similar to the full line curve (2) in Figs. 2 and 3. When oscillations operate upon the audion, the current which would be developed in the circuit of the device S, were the rectifier R omitted from the system shown in Fig. 1, would be represented by a curve somewhat similar to the sinuous curve (3) which is shown in full and dotted lines in Fig. 2; and when the rectifier is included as shown, the current which would be developed in the circuit of said device S would be represented by a curve somewhat similar to the full line curve (3) in Fig. 2.

Inasmuch as the resultant of the sinuous curve designated as (2) in Fig. 2 and the curve (1), namely, the sinuous curve (3), lies wholly above the axis of abscissæ, or, in other words, inasmuch as the current passing through the device S when the rectifier is omitted is an alternating current superimposed upon a unidirectional current, the amplitude of which is greater than the maximum amplitude of said alternating current, it is necessary to segregate said currents in order to rectify the alternating current. For this purpose the impedance L may be connected in shunt with the rectifier R. In such case the direct current passes through the impedance L while the alternating current, being prevented by said impedance from passing around the rectifier, is rectified and passes through S' as a unidirectional pulsating current, as shown in Figs. 2 and 3 by the full-line curve marked (2). When the rectifier is connected as shown, the current passing through the device S also is a unidirectional pulsating current as shown by the curve marked (3) in Fig. 2. A current of this character will produce an integral effect in an electro-receptive device other than one of the shifting-zero type.

I do not wish to be limited to the exact arrangement of apparatus and circuits herein described, inasmuch as it will be obvious that my invention may be subjected to a wide range of variation without departing from the principle thereof.

I claim,

1. In a space telegraph receiving system, the combination with a resonant circuit including a condenser, of a local receiving circuit connected across the terminals of said condenser and including in series an audion, a source of unidirectional electromotive force, an electro-translating device and a rectifier.

2. In a space telegraph receiving system, the combination with a resonant circuit including a condenser, of a local receiving circuit connected across the terminals of said condenser and including in series an audion, a source of unidirectional electromotive force, an electro-translating device and a rectifier; and a circuit of low resistance and high inductance connected in shunt to said rectifier.

3. In a space telegraph receiving system, the combination with a resonant circuit including a condenser, of a local receiving circuit connected across the terminals of said condenser and including in series an audion, a source of unidirectional electromotive force, an electro-translating device and a rectifier; and a circuit of high impedance connected in shunt to said rectifier.

4. In a space telegraph receiving system, a local receiving circuit including in series an audion, a source of unidirectional electromotive force, an electro-translating device and a rectifier.

5. In a space telegraph receiving system, a local receiving circuit including in series an audion, a source of unidirectional electromotive force, an electro-translating device and a rectifier; and a circuit of low resistance and high inductance connected in shunt to said rectifier.

6. In a space telegraph receiving system, a local receiving circuit including in series an audion, a source of unidirectional electromotive force, an electro-translating device and a rectifier; and a circuit of high impedance connected in shunt to said rectifier.

7. In a space telegraph receiving system, the combination with a resonant circuit including a condenser, of a local receiving circuit connected across the terminals of said condenser and including an oscillation detector constructed and arranged to cause the development of pulsating currents in said circuit when energized by electrical oscillations, and a source of unidirectional electromotive force, an electro-translating device and a rectifier, all connected in series with said oscillation detector.

8. In a space telegraph receiving system, the combination with a resonant circuit including a condenser, of a local receiving circuit connected across the terminals of said condenser and including an oscillation detector constructed and arranged to cause the development of pulsating currents in said circuit when energized by electrical oscillations, and a source of unidirectional electromotive force, an electro-translating device and a rectifier, all connected in series with said oscillation detector; and an impedance connected in shunt to said rectifier.

9. In a space telegraph system, a local receiving circuit including an oscillation detector constructed and arranged to cause the development of pulsating currents in said circuit when energized by electrical oscillations, and a source of unidirectional electromotive force, an electro-translating device and a rectifier, all connected in series with said oscillation detector.

10. In a space telegraph system, a local receiving circuit including an oscillation detector constructed and arranged to cause the development of pulsating currents in said circuit when energized by electrical oscillations, and a source of unidirectional electromotive force, an electro-translating device and a rectifier, all connected in series with said oscillation detector; and an impedance connected in shunt to said rectifier.

In testimony whereof, I have hereunto subscribed my name this 1st day of Jan., 1907.

JOHN STONE STONE.

Witnesses:
E. B. TOMLINSON,
GEO. K. WOODWORTH.